United States Patent [19]

Saitoh et al.

[11] Patent Number: 4,959,575
[45] Date of Patent: Sep. 25, 1990

[54] TRANSPOSITIONED MULTI-STRAND CONDUCTOR FOR ELECTRIC ROTARY MACHINE

[75] Inventors: Toshio Saitoh; Noriyoshi Takahashi; Masaki Satoh, all of Hitachi, Japan

[73] Assignee: Hitachi, Ltd., Tokyo, Japan

[21] Appl. No.: 377,762

[22] Filed: Jul. 10, 1989

Related U.S. Application Data

[63] Continuation of Ser. No. 571,945, Jan. 19, 1984, abandoned.

[30] Foreign Application Priority Data

Jan. 28, 1983 [JP] Japan .................. 58-11447

[51] Int. Cl.5 .............................. H02K 3/14
[52] U.S. Cl. ..................... 310/213; 174/34; 336/184
[58] Field of Search ............ 310/213; 174/33, 34; 336/187

[56] References Cited

U.S. PATENT DOCUMENTS 3,118,015  1/1964  Willyoung .............. 174/33
3,188,377  6/1964  Hughes ................... 174/33
3,252,117  5/1966  Fischer ................... 310/213
4,384,227  5/1983  Kawai .................... 312/213

FOREIGN PATENT DOCUMENTS 0072191 12/1915  Austria ................... 310/213
0752627  8/1980  U.S.S.R. ................ 310/213
0952752  3/1964  United Kingdom ....... 310/213

Primary Examiner—R. Skudy
Attorney, Agent, or Firm—Antonelli, Terry, Stout & Kraus

[57] ABSTRACT

Disclosed is a bar or conductor constituted by a plurality of strands disposed in a slot and extending outward from the opposite ends of the slot with each of the strands being substantially bisymmetrically vertically slanted so as to be transposed in the vicinity of a longitudinally central portion of the slot-inside bar portion. Each of the strands being transposed such that the respective strand arrangements at the opposite ends of the slot-outside bar end portions are reversed with respect to each other, with the total number of transposed portions of all the strands is less than three times the number of the strands.

2 Claims, 7 Drawing Sheets

TRANSPOSITIONED MULTI-STRAND CONDUCTOR FOR ELECTRIC ROTARY MACHINE

This application is a continuation of application Ser. No. 571,945, filed on Jan. 19. 1984, now abandoned.

BACKGROUND OF THE INVENTION

The present invention relates to transposed multi-strand conductors for use in an electric rotary machine such as a turbine generator, and more particularly to transposed multi-strand conductors suitable for windings in an armature in which a length of conductor portion received in the slot is short and the number of strands is large.

In a large capacity generator such as a turbine generator, a number of axially extending slots are formed in the inner periphery of a laminated fixed iron core and multi-strand conductors or bars for constituting armature windings are received in the slots, the armature bars being connected with each other at their opposite end portions externally projecting out of the core slots.

When an A.C. current flows in such a multi-strand bar, leakage magnetic flux circumferentially intersecting the slot is generated and voltages are induced across strands at portions in the longitudinal direction of the armature bar. If, in any pair of strands, a large difference is produced between the induced voltages across the strands over the length thereof, large circulating currents flow in the strands in the form of a closed loop, resulting in increase in losses as well as in heat generated in the armature bar. To cope with this problem, a method has been proposed in which the respective strands in the armature bar are transposed in various manners so as to make substantially uniform the voltages induced in the strands of the bar over the length thereof to prevent such circulating currents from flowing in the strands, as disclosed, for example, in U.S. Pat. Nos. 3,118,015 and 3,188,377.

The transposition of each of the strands in an armature bar is performed by successively changing the positions of the respective strands in the bar. Assume that each of the strands is circumferentially successively transposed in the cross-section of the bar about the center of the cross-section, and that the angle of rotation of each strand represents the extent of transposition of the strand. For example, "360° transposition" represents the transposition that each of the strands of an armature bar starting from a point at one end of a slot, in which the bar is received, is transposed to pass through various circumferential positions in the cross-section of the bar to come to the same position at the other end of the slot as the starting position, when viewed in the cross-section of the bar.

In an ordinary generator, all the strands of an armature bar are shorted at their opposite ends with each other. Since there exists leakage flux at the opposite end portions of the generator, voltages are induced due to such leakage flux at the end portions of the armature bar so that circulating currents flow in the bar to cause losses in the form of heat. Such losses may be decreased by correctly reversing the respective positions of the strands at the opposite ends of the bar to each other so as to make opposite the respective polarities of the voltages induced across the same strands at their opposite ends to thereby cancel the induced voltages with each other.

FIG. 1 shows an example of an armature bar 1 which is subjected to the Roebel transposition in which the angle of transposition is 540°, that is one rotation and a half. The armature bar 1 comprises a straight portion 2 of twisted strands adapted to fit in a winding slot of an electric rotary machine (not shown) and also includes opposite end-turn portions 3 and 4 (only portions are shown) which curve both circumferentially and radially from the straight slot portion 2, along a complex curve. The armature bar 1 is made up of two stacks of 5 and 6 of strands, with each stack containing six strands, therefore twelve strands a to l being contained in the armature bar 1. The transposition is accomplished by respectively bending the strands from the top of one stack 6 into the other stack 5 while the strands from the other stack 5 are bent from the bottom thereof back into the one stack 6. The transposed positions of the respective strands a to l are designated with the same lower case letter designations a to l of the corresponding strands. The transposition pitch $P_1$ in the vicinity of the opposite ends of the slot-inside bar portion 2 is selected to be about a half of the transposition pitch $P_2$ in the vicinity of the center portion of the same. By selecting the transposition pitch in this manner, the inductance provided in the respective strands in the slot may be made substantially uniform. Since the number of transpositions from one stack to the next one is three for each strand in the case of 540° transposition, the total number of transpositions of each bar in one slot is 3n, where n represents the number of all the strands of the bar. FIG. 2 shows the state of the strand transposition from one stack to the next.

In such a case as above where the number of transpositions is large and the pitch of transposition is short, the possibility that the thin strand insulation is damaged to thereby cause shortcircuit in the strands increases.

In order to increase the output density of a generator, that is, in order to reduce the generator volume per unit capacity thereof, generally a method is employed in which the axial length of the generator is reduced without so changing the dimension of the cross-section in the direction perpendicular to the axial direction of the generator. Accordingly, the axial length of the generator is made shorter as the density of output of the generator is made higher and in the case where the number of strands is large the above-mentioned possibility of occurrence of strand shortcircuit greatly increases.

As a result, in the case where the 540° transposition can not be performed, it is necessary to employ the 450° transposition, that is the transposition of one rotation and a quarter, or the 360° transposition, that is one rotation. The state of transposition of strands when the 360° transposition is employed is briefly shown in FIG. 3 by using two strands a and d representing all the strands. In FIG. 3, the solid line indicates that the strand exists in the stack 5 on this side of the plane of the paper, while the broken line indicates that the strand exists in the stack 6 on the rear side of the paper plane. The currents $I_1$ to $I_4$ induced in the strands a and d at their opposite end portions outside the slot due to the slot end magnetic flux $\phi_1$, $\phi_2$ flow in the direction to add with each other because the respective strand is arranged in the same positions at its opposite end portions in the 360° transposition so that a large circulating current flows in the pair of strands which are shorted at their opposite end portions to form a closed loop, resulting in a possibility of generating local overheat.

Further, the Roebel transposition method has been proposed in which the number of strands is small and the arrangement of the strands at their opposite end portions are reversed to each other. An example of this transposition method is shown in FIG. 4 and the state that each strand shifts to the next stack is shown in FIG. 5. The bar 1 is transposed by 180°, that is by half rotation, at the straight slot-inside bar portion 2. Accordingly, in the case of this transposition, the currents induced in the respective strands at their opposite slot-outside end portions due to the slot end magnetic flux flow in the direction to cancel with each other so that the circulating current flowing in the pair of strands in the form of a closed loop is small. However, the inductance value of the respective strands can not be made uniform so that the distribution of currents flowing in the respective strands may greatly vary as shown in FIG. 6, resulting in increase of the losses in the form of heat generated in the bar so as to cause a possibility of occurence of local overheating.

SUMMARY OF THE INVENTION

An object of the invention is to provide transposed multi-strand conductors or bars for use in an electric rotary machine, which is easily applied in the case where the straight slot-inside bar portion is short and the number of strands of the bar is large, and in which the losses generated in the bar is little and the possibility of occurence of local overheating is low.

To attain this object, according to the present invention, the multi-strand bar is featured in that each of the strands of the bar is bisymmetrically vertically slanted in the vicinity of the longitudinally central portion of the bar so as to make substantially zero the actual amount of magnetic flux crossing the slot to provide interlinkage with any strands, in that the respective arrangements of each strand at the opposite slot-outside portions are reversed to each other, and in that the total number of transposed portions of all the strands is selected to be smaller than three times the number of the strands.

DESCRIPTION OF THE PREFERRED EMBODIMENTS

Figure 1:
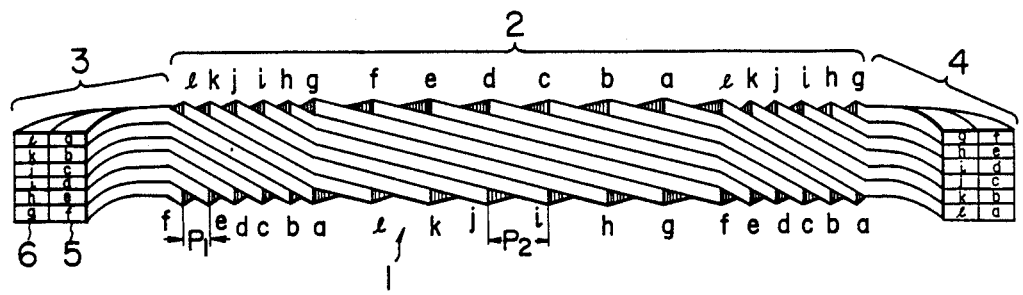
FIG. 1 is a side view of a conventional transposed conductor or bar.
Figure 2:
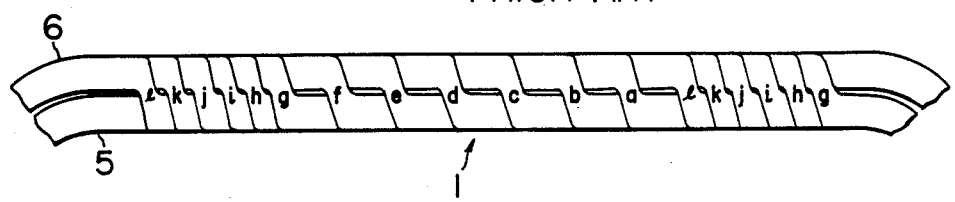
FIG. 2 is a plan view of the bar of FIG. 1.
Figure 3:
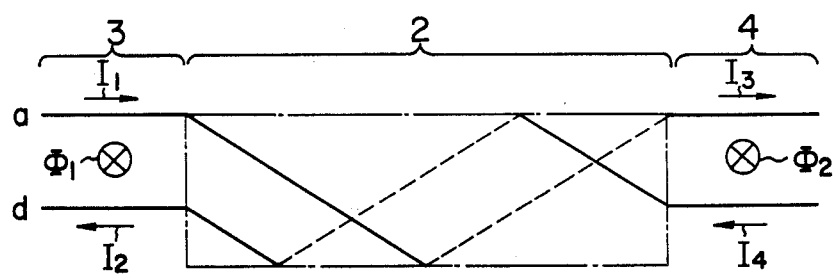
FIG. 3 is a schematic diagram showing the state of interlinkage of the end portion leakage flux with the strands in the conventional bar shown in FIGS. 1 and 2.
Figure 4:
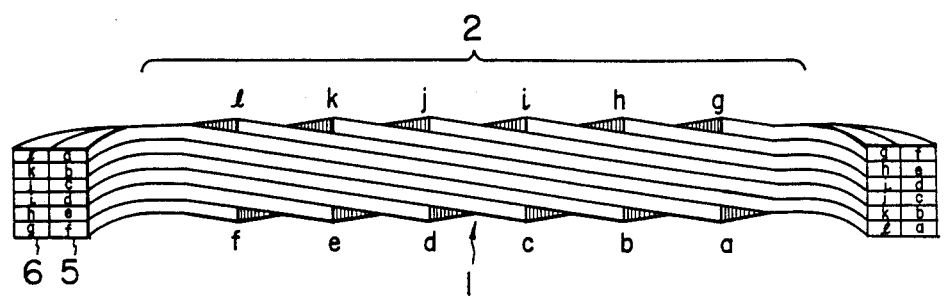
FIG. 4 is a side view of another conventional transposed conductor or bar.
Figure 5:
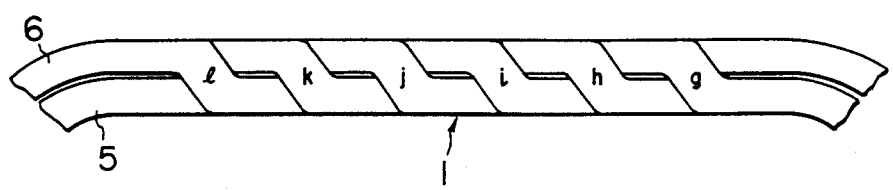
FIG. 5 is a plan view of the bar of FIG. 4.
Figure 6:
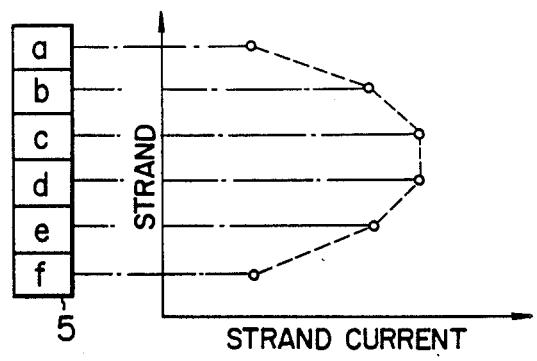
FIG. 6 is a schematic diagram showing the current distribution in the strands in the bar shown in FIGS. 4 and 5.

Referring to the drawings, preferred embodiments of the present invention will be now described hereunder.

Figure 7:
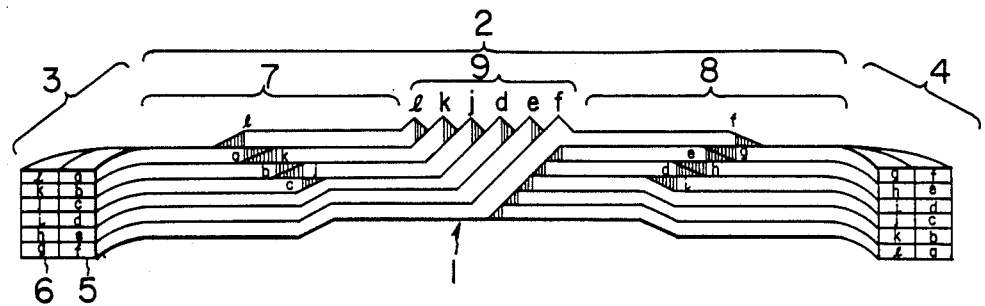
FIG. 7 is a side view of a transposed conductor or bar according to an embodiment of the present invention.
Figure 8:
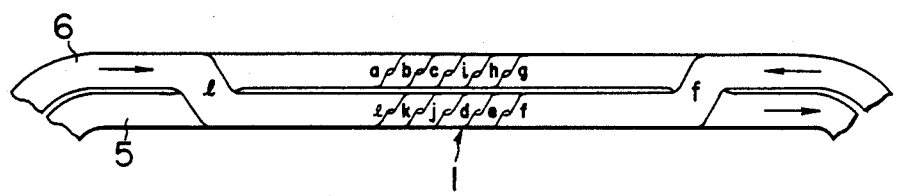
FIG. 8 is a plan view of the bar of FIG. 7.

As shown in FIGS. 7 and 8, the armature bar 1 is constituted by two strand stacks 5 and 6 containing strands a-f and strands g-l respectively. Generally, although the armature bar 1 includes more strands than those shown in the drawing, the number of the strands shown in the drawing is sufficient to explain the present invention and the present invention can be applied to an armature bar containing a large number of strands in the same manner.

There is a proposal about a bar in which each strand is formed with a hole through which a cooling gas or liquid is circulated. Such a structure of the strand does not directly relate to the present invention, however, and the description thereof is omitted here. Further, the description about the insulation is also omitted for the same reason.

The bar 1 includes a slot-inside bar portion 2 and slot-outside bar portions 3 and 4. The slot-inside bar portion 2 of the bar 1 is sectioned into slot-inside end portions 7 and 8 at which the strand does not so move in the direction of depth of the slot and a central slanted-strand portion 9 at which the strand moves in the direction of depth of the slot. At the slot-inside end portions 7 and 8, the adjacent strands which are disposed substantially in the same level in the direction of depth of the slot, for example the strands a and l, are transposed to cross with each other. If such crossing of the strands is effected at proper intervals in the longitudinal direction of the strands as seen in FIG. 7, the thickness of the bar 1, in the direction of the depth of the slot, does not so increase and the increment is within about the thickness of one or two strands. A first half or first set of the strands are transposed at one slot-inside end portion and the second half or second set of the strands are transposed at the other slot-inside end portion.

At the central slanted-strand portion 9, the width and thickness of each of the strands a-l are made half and double, respectively, and the strands are successively transposed only in the same stack between vertically adjacent upper and lower strands, without performing the transposition of the strands between the adjacent stacks. The crossovers are applied with the designations a-l of the corresponding strands.

In this arrangement of transposition, as seen in FIG. 7, the arrangement of strands at the one slot-outside bar portion 3 is reversed to the strand arrangement at the other slot-outside bar portion 4, similarly to the conventional transposition of half rotation or one and half rotations, so that the currents induced in each strand at the opposite slot-outside end portions flow in the direction to cancel with each other and a circulating current flowing in the strand pair forming a closed loop is small.

Figure 9:
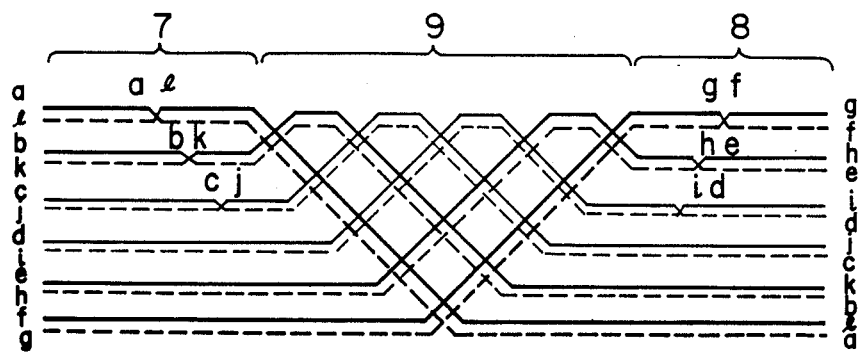
FIG. 9 is a schematic diagram showing the state of transposition of the strands of the bar shown in FIGS. 7 and 8.

In FIG. 9, the solid lines correspond to the plane of the strand stack 5, that is the strand stack on this side of the paper, while the broken lines correspond to the strand stacks 6, that is the strand stack on the rear side of the plane of the paper.

Figure 10:
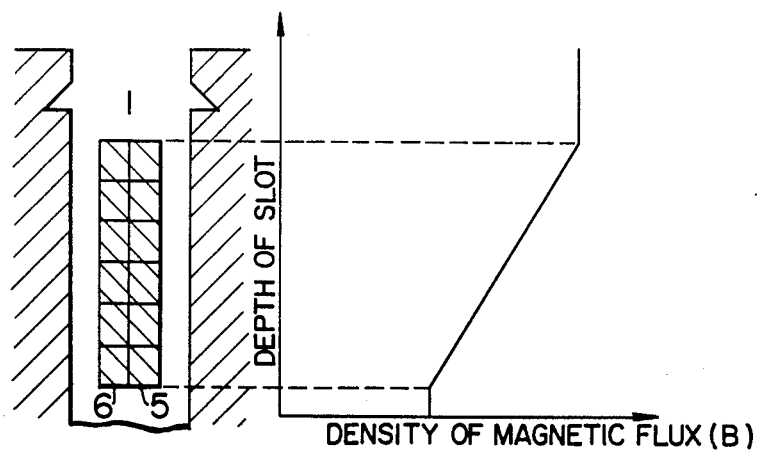
FIG. 10 is a diagram showing the distribution of magnetic flux density in the core slot.

Generally, the less the distance to the opening of the slot, that is to the uppermost of the bar, the higher the density of magnetic flux, resulting in for example a flux distribution shown in FIG. 10.

Figure 11:
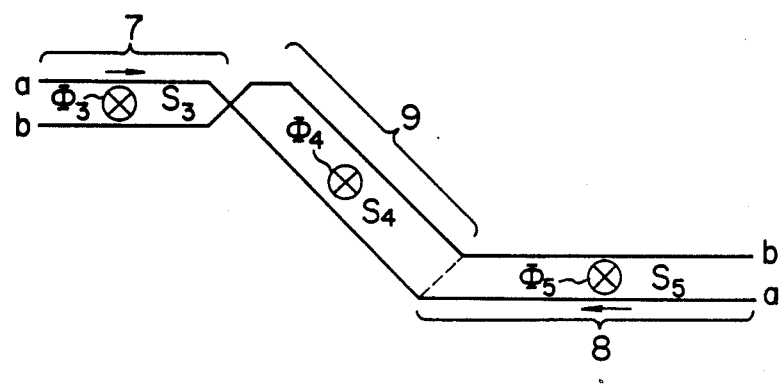
FIGS. 11 to 14 are schematic diagrams showing the various states of interlinkage between the magnetic flux crossing the slot, and the respective strands.

As shown in FIG. 11, between the respective slot inside portions of the strands a and b, magnetic flux $\phi_3$, $\phi_4$ and $\phi_5$ cross the slot. The magnetic flux $\phi_3$, and $\phi_5$ are in the slot-inside end portions 7, 8, respectively, and the magnetic flux $\phi_4$ is in the central slanted-strand portion 9. Assuming that the magnetic flux $\phi_3$, $\phi_4$ and $\phi_5$ have interlinkage areas $S_3$, $S_4$, and $S_5$, the sum ($\phi_4$, +$\phi_5$) of the magnetic flux $\phi_4$, $\phi_5$ and the magnetic flux $\phi_3$, induce voltages across the strands a and b, the voltages have opposite polarities. Since a flux density $B_3$ of magnetic flux $\phi_3$, is larger than the flux density (average flux density) $B_4$ of the magnetic flux $\phi_4$ and the flux density $B_3$ of the magnetic flux $\phi_3$, although the interlinkage area $S_3$ of the magnetic flux $\phi_3$, is smaller than the total interlinkage areas ($S_4+S_5$) of the sum magnetic flux ($\phi_4$, $\phi_5$), it is possible to make the voltages induced across the strands a and b zero due to the respective magnetic flux $\phi_3$, $\phi_4$ and $\phi_5$, the properly adjusting the longitudinal length of the central slanted-strand bar portion such that the respective amounts of magnetic flux ($B_3 \times S_3$) and ($B_4 \times S_4 + B_5 \times S_5$) are equal to each other. strand bar portion 9 such that the respective amounts of magnetic flux ($B_3 \times S_3$) and ($B_4 \times S_4 + B_5 \times S_5$) are made equal to each other.

Figure 12:
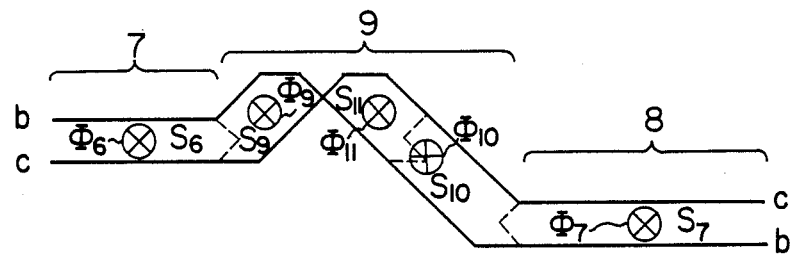
Figure 13:
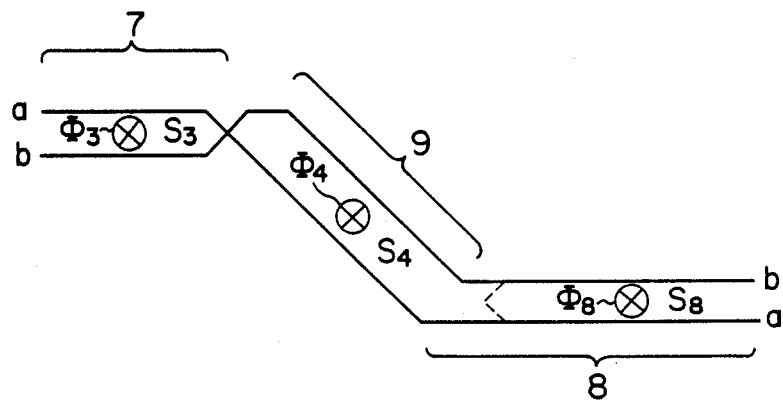

FIG. 12 shows the state of transposition of the strands b and c at their slot-inside portions and the state of magnetic flux intersecting the strands b and c. Further, FIG. 13 shows the state of magnetic flux intersecting the slot-inside portions of the strands a and b in which the sectioning of flux is somewhat different from that in FIG. 11. The reason why the sectioning of flux in FIG. 13 is different from that in FIG. 11 is that the comparison of the amount of flux can be easily made between FIGS. 11 and 13 because the respective lengths of the slot-inside portions 7 and 8 of the strands b and c are different from those of the strands a and b.

FIGS. 12 and 13, explain the fact that the actual amount of magnetic flux intersecting the slot-inside portions of the strands b and c is substantially zero.

Assume that a portion between the strands b and c at the slot-inside end portion has an interlinkage area $S_6$ equal to the flux interlinkage areas $S_3$ between the stands a and b at the slot-inside end portion 7 and a magnetic flux $\phi_6$, intersecting the area $S_6$ has a flux density $B_6$. Further, assume that a magnetic flux $\phi_7$ in an interlinkage area $S_7$ between the strands b and c at the slot-inside end portion 8 has a flux density $B_7$ intersecting the interlinkage area $S_7$, and the magnetic flux $\phi_8$ (=$\phi_5$) intersecting an interlinkage area $S_8$ located between the strands a and b at the slot-inside end portion, equal to the interlinkage area $S_7$ has a flux density $B_8$ (=$B_5$). Further, assume that a magnetic flux $\phi_9$ in an interlinkage area $S_9$ of a leftward-lowering portion between the strands b and c at the central slanted-strand portion 9 on the side adjacent to the slot-inside portion 7 has a flux density $B_9$, while a magnetic flux $\phi_{10}$ in a total interlinkage area $S_{10}$ of a rightward-lowering portion between the strands b and c at the central slanted-strand portion 9 on the side adjacent to the slot-inside portion 8 has a flux density $B_{10}$, and the flux density $B_{11}$ (=$B_9$) of the magnetic flux $\phi_{11}$ intersects the interlinkage area $S_{10}$ located in the interlinkage area $S_{11}$ at its left upper portion and equal to the area $S_9$.

In FIGS. 12 and 13, in the slot-inside end portion 7, the portion between the strands a and b is located at a position above the portion between the strands b and c, the flux density $B_3$ of the magnetic flux $\phi_3$ intersecting the portion between the strands a and b is larger than the flux density $B_6$ of the magnetic flux $\phi_6$ intersecting the portion between the strands b and c ($B_3 > B_6$), and the respective interlinkage areas $S_3$ and $S_6$ of these portions are equal to each other ($S_3 = S_6$), therefore the amount ($B_3 \times S_3$) of the magnetic flux $\phi_3$ is larger than that ($B_6 \times S_6$) of the magnetic flux $\phi_6$. Accordingly, the difference between the respective amounts ($B_6 \times S_6$) and ($B_7 \times S_7$) of the magnetic flux $\phi_6$ and $\phi_7$ intersecting the portions between the strands b and c at the slot-inside portions 7 and 8 respectively is larger than the difference between the respective amounts ($B_3 \times S_3$) and ($B_8 \times S_8$) of the magnetic flux $\phi_3$ and $\phi_8$ intersecting the portions between the strands a and b at the slot-inside portions 7 and 8, respectively.

On the other hand, in the central slanted-strand portion 9, the respective magnetic flux $\phi_9$ and $\phi_{11}$ induce voltages having opposite polarity to each other across the strands b and c, and the respective amounts ($B_9 \times S_9$) and ($B_{11} \times S_{11}$) of the magnetic flux $\phi_9$ and $\phi_{11}$ are equal to each other because $S_9 = S_{11}$ as described above. Accordingly, in the central slanted-strand portion 9, the actual amount of magnetic flux intersecting the portion between the strands b and c is the difference obtained by subtracting the amount ($B_{11} \times S_{11}$) of the magnetic flux $\phi_{11}$ from the amount ($B_{10} \times S_{10}$) of the magnetic flux $\phi_{10}$. It is apparent that this difference is smaller than the amount ($B_4 \times S_4$) of the magnetic flux $\phi_4$ intersecting the portion between the strands a and b at the central slanted-strand portion 9 from the comparison between the areas at the central slanted-strand portions in FIGS. 11 and 13 respectively.

Considering the fact as described above and the fact that the amount of the magnetic flux $\phi_3$ is equal to that of the magnetic flux ($\phi_4+\phi_5$), the sum of the amount of the magnetic flux ($\phi_{10}-\phi_{11}$) and the amount of the magnetic flux $\phi_7$ is substantially equal to the amount of the magnetic flux $\phi_6$. Further, the magnetic flux $\phi_6$ and the magnetic flux ($\phi_{10}-\phi_{11}+\phi_7$) induce voltages, respectively, across the strands b and c in the opposite directions to each other, and therefore the actual magnetic flux intersecting the portion between the strands b and c at the slot-inside portion becomes substantially zero and the voltage induced across the strands becomes therefore substantially zero.

Figure 14:
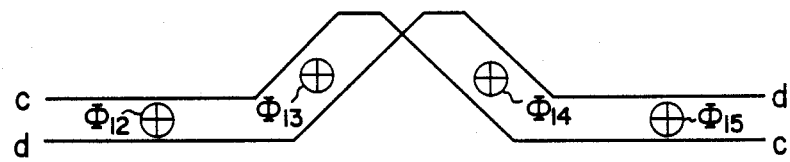

FIG. 14 shows the status of transposition of the strands c and d in the slot-inside portion thereof and the status of magnetic flux intersecting the portion therebetween. Although the magnetic flux $\phi_{12}-\phi_{15}$ intersect the portion between the strands c and d, it is apparent that the actual amount of magnetic flux is substantially zero because of the symmetry of arrangement as seen in the drawing and therefore the voltage induced across the strands c and d also is substantially zero.

The same as those described above applies to the other strand pairs and the voltage induced across each strand pair is substantially zero.

It is of course true that there is substantially no actual magnetic flux (magnetic flux crossing the slot) as to a pair of strands which are located at the same high points in the slot, and therefore substantially no voltage is induced across such a strand pair.

In this embodiment, the number of times of transposition of the respective strands from one stack to the next stack is equal to the number n of the strands. The number of transposition of the respective strands in one stack is also equal to the number n of the strands. Accordingly, the total number of transposition becomes 2n. Since the total number of transposition in the bar subjected to 540° level transposition is 3n, the total number of transposition can be reduced to ⅔ in this embodiment in comparison with the case of 540° Roebel transposition, and therefore this embodiment can be easily applied to a bar having a short slot-inside bar portion and having a large number of strands.

Further, since the actual amount of magnetic flux intersecting a portion between any strands at the slot-inside portion thereof can be made substantially zero, the influence of the magnetic flux intersecting the slot can be eliminated so that the current distribution in the respective strand can be made uniform.

Furthermore, since the respective strand arrangements at the opposite slot-outside portions of the bar are made reversed to each other, the respective polarities of the voltages induced across strands due to leakage magnetic flux at the opposite ends of the generator are opposite to each other so that the currents due to these voltages are cancelled and the circulating current becomes substantially zero. That is, the same effect can be obtained also in this case as in the case of 540° interposition.

Figure 15:
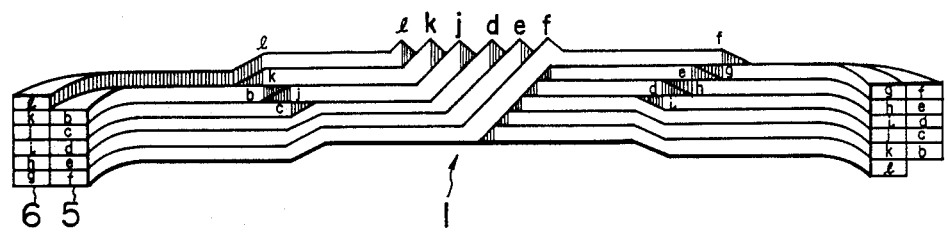
FIG. 15 is a side view of a transposed conductor or bar according to another embodiment of the present invention.
Figure 16:
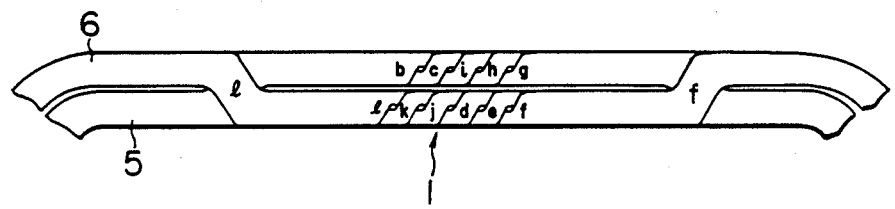
FIG. 16 is a plan view of the bar of FIG. 15.

The embodiment of FIGS. 15 and 16 is different from the embodiment of FIGS. 7 and 8 in that the number of strands are odd in the former. That is, the number of strands are odd in the former. That is, the number of strands is eleven in the embodiment of FIGS. 15 and 16, while the number of strands is twelve in the embodiment of FIGS. 7 and 8. Thus, the interposition can be performed as shown in the drawings also in this embodiment with the same effect as the embodiment of FIGS. 7 and 8.

Figure 17:
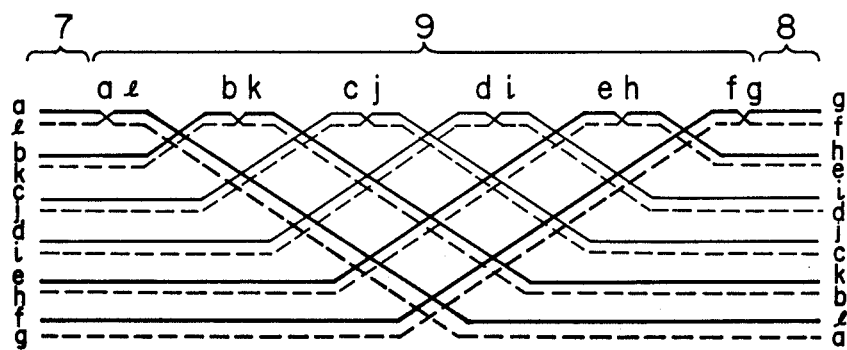
FIG. 17 is a schematic diagram showing the state of transposition of the strands according to a further embodiment of the present invention.

The embodiment FIG. 17 differs from the embodiment of FIG. 9 in that the transposition between a pair of strands adjacently disposed at the same depth in the slot is performed mainly at the central slanted-strand portion 9 of the bar and when the pair of strands come the uppermost position in the bar, almost without being performed at each of the slot-inside end portions 7 and 8 of the bar. Consequently the embodiment of FIG. 17 is suitable in situations where the central slanted-strand portion 9 of the bar is considerably long in comparison with the slot-inside end portions 7 and 8 and it is difficult to perform the transposition between adjacent strands in each of the slot-inside end portions 7 and 8.

Figure 19:
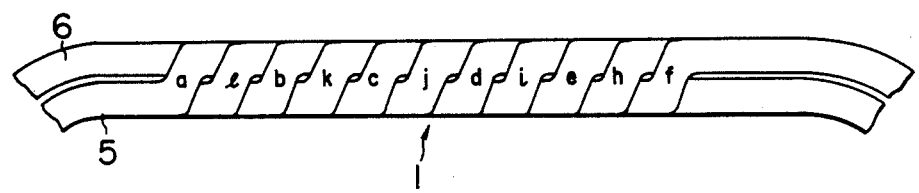
FIG. 19 is a plan view of the bar of FIG. 18.
Figure 20:
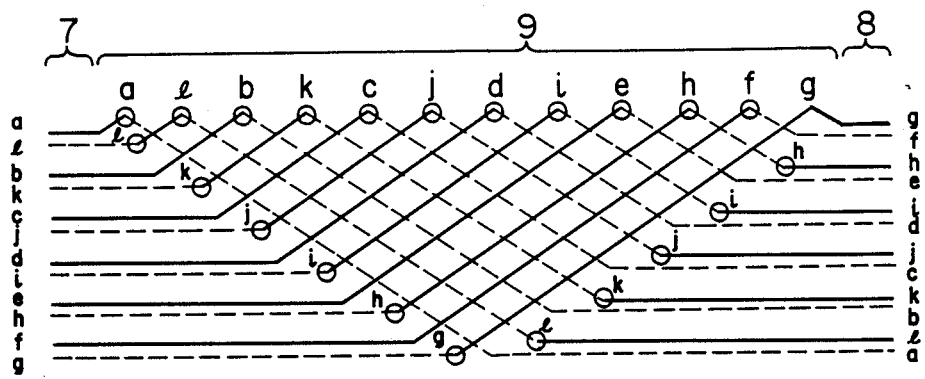
FIG. 20 is a schematic diagram showing the state of transposition of the strands of the bar shown in FIGS. 18 and 19.

In FIG. 20 the solid lines indicate the strand portions existing in the solid lines indicate the strand portions existing in the strand stack 5 (FIGS. 18, 19) on this side of the paper plane of the drawing, while broken lines indicate the strand portions in the strand stack 6 (FIGS. 18, 19) on the rear side of the same.

Figure 18:
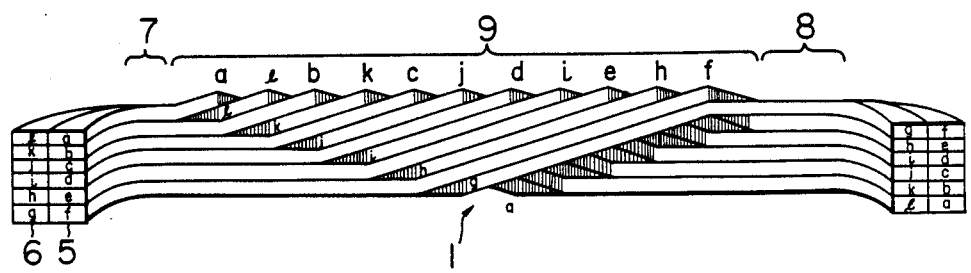
FIG. 18 is a side view of a transposed conductor or bar according to a still further embodiment of the present invention.

This embodiment of FIGS. 18–20 differs from the respective embodiments previously described in the number of transposition into the next strand stack, the method of transposition, and the place of transposition. That is, each of the strands existing in the strand stack 6 at the slot-inside end portion 7 on the rear side of the paper plane of drawing is transposed once in the vicinity of the boundary between the slot-inside end portion 7 and the central slanted-strand portion 9 into the strand stack 5 on this side of the paper plane of drawing, transposed again at the uppermost portion in the central slanted-strand portion 9 into the strand stack 6, and transposed further again in the vicinity of the boundary between the slot-inside end portion 8 and the central slanted-strand portion 9 into the strand stack 6 on the rear side of the paper plane of drawing. Only the strand g, however, is transposed only once in the vicinity of the boundary between the slot-inside end portion 7 and the central slanted-strand portion 9 into the strand stack 5 on this side of the plane of the paper, without being further transposed thereafter. On the other hand, each of the strands existing in the strand stack 5 at the slot-inside end portion 7 on this side of the paper of drawing is transposed only once at the uppermost portion in the central slanted-strand portion 9 into the strand stack 6 on the rear side of the paper plane of drawing. In conclusion, each of the strands is transposed into the next strand stack at each portion indicated by a small white circle o in FIG. 20. The number of transposition of this bar is 2(n−1).

In this embodiment; not only the same effect can be obtained as in the previously described embodiments but there is an advantage that the bar can be easily formed since it is not necessary to change the shape of the cross-section of each strand over its length.

As described above, according to the present invention, the number of transposition of the bar can be reduced, and the invention can be easily applied to such a winding in which the length of the iron core of the electric rotary machine, that is the length of the slot-inside portion of the strands, is short and the number of the strands is large. Further, it possible to reduce the influence of the magnetic flux intersecting the slot to thereby make the current distribution in the respective strand uniform, and the respective strand arrangements at the opposite slot-outside end portions of the bar are reversed so that the influences of the leakage magnetic flux at the opposite ends of the electric rotary machine are cancelled with each other to thereby make it possible to reduce the circulating current flowing in each pair of strands. As the result, it is possible to reduce the losses generated in the bar and to reduce the possibility occurence of local overheat.

We claim:

1. A transposed multi-strand bar for a rotary electric machine, the transposed multi-strand bar being adapted to be received in a slot of a stator core of a rotary electric machine, the transposed multi-strand bar comprising:
   a centrally disposed slanted strand portion;
   a slot-inside end portion disposed on a first side of said centrally disposed slanted strand portion and on a second side thereof;
   slot-outside end portions leading out of opposite slot-inside end portions of said stator core;
   at least two adjacent groups of strands, each group of strands including a plurality of stacked strands divided into a first half and second half of strands transposed in such a manner that the respective stands have different stacked portions in the respective slot-inside end portions and the centrally disposed slanted strand portion, each of said groups of strands being shorted at each end thereof, wherein the transposition of the respective strands of the first half of strands is effected in such a manner that strands disposed at an uppermost position of the first half of strands of the respective groups of strands are transposed in the slot-inside end portion on the first side of the centrally disposed slanted portion to longitudinally gradually descend through the centrally disposed slanted portion from the uppermost position to a lowermost position in the slot-inside end portion on the second side of the centrally disposed slanted portion and strands disposed in a lowermost position of the second half of strands longitudinally gradually ascend through the slot-inside end portion on the first side of the centrally disposed slanted portion so as to reach the uppermost position in the slot-inside end portion on the second side of the centrally disposed slanted portion and are transposed thereat, and wherein strands arranged between the uppermost and lowermost position of the respective groups of strands are transposed at a position in a vicinity of an intersecting point with the strand which is descending from the uppermost position and the strand which is ascending from the lowermost position while following the descent and ascent of the respective descending and ascending strands from the uppermost and lowermost positions, whereby adjacent strands of the first half of strands are transposed to opposite strand stacks to each other in said slot-inside end portion on the first side of the centrally disposed slanted strand portion and adjacent strands of the second half of strands respectively located are transposed to opposite strand stacks in the slot-inside end portion on the second side of the centrally disposed slanted portion so that no circulating current flows between adjacent strands in the respective slot-inside end portions even if a magnetic flux is inputted in either a vertical or horizontal direction to the multi-strand bar.

2. A transposed multi-strand bar according to claim 1, in which each of said strands is formed to have a width and a thickness which are half and double, respectively, at a slanted portion at said slot-inside bar portion and wherein the transposition of each of said strands is provided in the same strand stack.

* * * * *